United States Patent [19]

Mori

[11] Patent Number: 4,770,484
[45] Date of Patent: Sep. 13, 1988

[54] LIGHT RADIATOR

[76] Inventor: Kei Mori, 3-16-3-501, Kaminoge, Setagaya-ku Tokyo, Japan

[21] Appl. No.: 931,461

[22] Filed: Nov. 14, 1986

[30] Foreign Application Priority Data

Jan. 29, 1986 [JP] Japan .................... 61-17492

[51] Int. Cl.⁴ .................... G02B 6/26; G02B 17/00
[52] U.S. Cl. .................... 350/96.15; 350/259
[58] Field of Search ............ 350/96.10, 96.15, 96.24, 350/258, 259, 262, 265; 362/1, 26, 32

[56] References Cited

U.S. PATENT DOCUMENTS 4,128,332 12/1978 Rowe .................... 350/96.1 X
4,561,043 12/1985 Thompson .................... 362/32

FOREIGN PATENT DOCUMENTS 0118806 6/1985 Japan .................... 350/96.1

Primary Examiner—Eugene R. Laroche
Assistant Examiner—Nathan W. McCutcheon
Attorney, Agent, or Firm—Jordan & Hamburg

[57] ABSTRACT

A light radiator comprises a cylindrical optical conductor rod in which light rays are guided into the optical conductor rod from one end portion or both end portions thereof. The guided light rays into the optical conductor rod are radiated from the optical conductor rod in a radial direction. The optical conductor rod is divided into plural pieces in radical direction along its center line as a common line and the respective division surfaces are provided with a reflection surface.

12 Claims, 2 Drawing Sheets

LIGHT RADIATOR

BACKGROUND OF THE INVENTION

The present invention relates to a light radiator in which, in case that light rays such as solar rays focused by use of a lens system or the like are transmitted to a distant place through an optical conductor cable, and the same are emitted from the optical conductor cable at the distant place and utilized as light energy. The light energy can be radiated in a desired radial direction of the optical conductor rod transmitting the light energy therethrough.

In the recent years, the interest concerning solar rays energy is increasing day by day. Research-and-development thereof is actively performed in various technical fields for effectively utilizing solar energy.

In the case of utilizing the solar ray energy, if solar rays energy is utilized without converting the solar ray energy to electric energy, thermal energy, or the like, it is apparent that there is no conversion loss, and therefore the energy can be utilized most effectively. For instance, the solar rays collected outdoors are guided through an optical conductor cable to a place such as an indoor space needed to be illuminated, or same are guided into the sea for nurturing marine animals and plants. Furthermore, various other methods of utilizing the solar ray energy as a light source have been already proposed. Namely, solar rays are utilized for the propagation of microscopic organism such as chlorella or the like, for promoting the health of the human body, for treating arthritis, neuralgia, bedsores, rheumatism, injuries, bone fractures, or the like and stopping the pain of these diseases, or for the other like purposes.

However, in the case of emitting light rays from the end surface of an optical conductor, the radiation angle of the focused light rays turns out to be approximately 45°. Such light rays are considered to become nearly equal to a spot light source, so that the area and the direction of light rays radiation are limited. Consequently, it is not always possible to obtain a satisfactory light source.

In order to overcome such defect, the present applicant has previously proposed in various ways light radiators in which light rays transmitted through the optical conductor cable, as mentioned above, are guided into the optical conductor rod and radiated in a radial direction of the optical conductor rod.

However, in such proposed light radiators, the light rays are mainly radiated approximately uniformly in the radial direction of the optical conductor rod ranging over the entire angle of radiation. Consequently, it is impossible to radiate the light rays in a specially designated radial direction of the optical conductor rod, and therefore the light rays cannot be utilized effectively. The above-mentioned arrangement was a disadvantage of the aforementioned proposed light radiators.

SUMMARY OF THE INVENTION

The primary object of the present invention is to provide a light radiator capable of radiating light rays transmitted through an optical conductor rod in a desired radial direction of the optical conductor rod.

It is another object of the present invention to provide a light radiator capable of radiating the light rays in the desired radial direction ranging within the area of radiation angle by use of a simple and low-cost construction.

It is another object of the present invention to provide a light radiator capable of radiating the light rays transmitted therethrough in the desired radial range in order to illuminate only a desired area.

The above-mentioned features and other advantages of the present invention will be apparent from the following detailed description which goes with the accompanying drawings.

DESCRIPTION OF THE PREFERRED EMBODIMENTS

Figure 1:
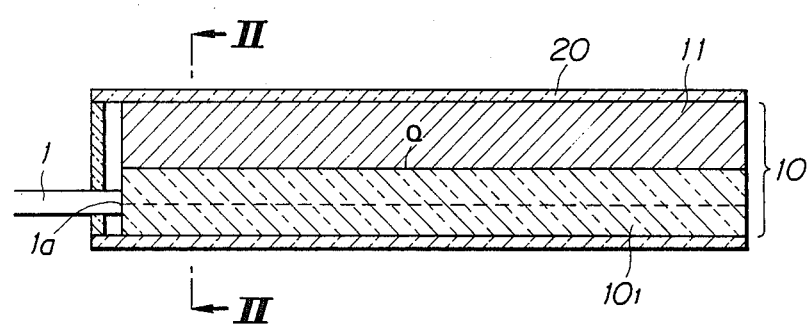
FIG. 1 is a cross-sectional side view taken along the line I—I in FIG. 2A showing an embodiment of a light radiator according to the present invention.
Figure 2A:
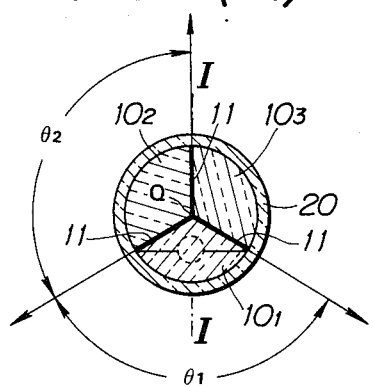
FIG. 2A is a cross-sectional view taken along the line II—II of FIG. 1.
Figure 2B:
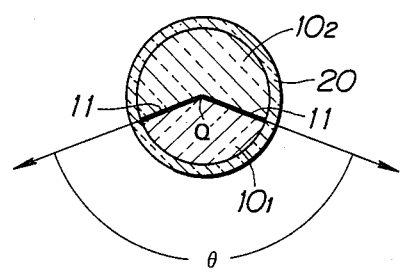
FIGS. 2B through 2D are cross-sectional views taken along the line II—II of FIG. 1, respectively, but showing modifications of the present invention.
Figure 2C:
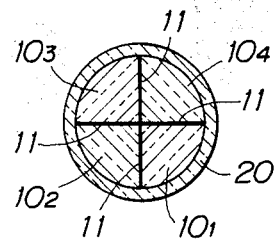
Figure 2D:
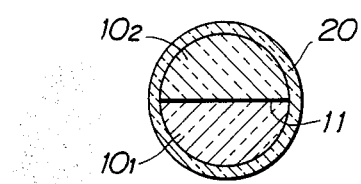

FIG. 1 is a cross-sectional side view for explaining an embodiment of a light radiator according to the present invention and is a cross-sectional view taken along the line I—I of FIG. 2A). FIG. 2A is a cross-sectional view taken along the line II—II of FIG. 1. FIGS. 2B through 2D are cross-sectional views taken along the line II—II of FIG. 1 showing modifications of the present invention.

In those figures, 1 is an optical conductor cable for transmitting therethrough solar rays collected by a solar rays collecting device not shown in the figures, 10 an optical conductor rod according to the present invention, and 20 a transparent cylindrical case for accommodating the optical conductor rod 10.

In relation to the optical conductor rod shown in FIG. 1 and FIG. 2A, the optical conductor rod 10 is divided into three portions; $10_1$, $10_2$ and $10_3$, in a radial direction along its center line Q as a common line and the respective division surfaces are formed with a reflection surface such as mirror surface 11. The transparent cylindrical case 20 receives therein the optical conductor rod pieces $10_1$ to $10_3$ divided as mentioned above in order to define a form of the optical conductor rod 10. However, the case 20 is not always necessary, in the case of binding these division (reflection) surfaces of the afore-mentioned optical conductor rod divided into three pieces to each other by means of adhesive such as optical paste. Namely, the case 20 may be removed after binding and defining the form of rod.

Furthermore, in the present invention, the light rays emitting end 1a of the optical conductor cable 1 can be installed so as to oppose to the end surface of the respective optical conductor rod pieces $10_1$ to $10_3$ divided as mentioned before. When the light emitting end 1a is installed so as to oppose the optical conductor rod $10_1$ as shown in FIG. 2A, the light rays can be radiated in the radial direction ranging within the area of angle $\theta_1$ along the axial direction of the optical conductor rod. Similarly, when the light emitting end 1a is installed so as to oppose the optical conductor rod $10_2$, the light rays can be radiated in the radial direction ranging within the area of angle $\theta_2$ along the axial direction of the optical conductor rod.

FIGS. 2B through 2D are cross-sectional views showing modifications of the light radiator according to the present invention. The embodiment of FIG. 2B shows the cross-section of another optical conductor rod divided into two pieces $10_1$ and $10_2$ at a desired angle of $\theta$. The embodiment of FIG. 2C shows the cross-section of still another optical conductor divided into four pieces $10_1$ to $10_4$. The embodiment of FIG. 2D shows the cross-section of still another optical conductor divided into two pieces $10_1$ and $10_2$ as is the case of FIG. 2B, in which the angle $\theta$ is equal to 180°. However, it will be easily understood that the present invention is not limited to the above-mentioned embodiments, but the other various embodiments or modifications can be realized.

Furthermore, although the embodiment constructed with the light radiator having a cross-section of circular form has been described heretofore, it will be possible to construct the light radiator having a cross-section of triangular form, tetragonal form, or other forms. And further, although the embodiments show the light rays guided into the optical conductor rod only from one end portion thereof, it will be possible to guide the light rays into the optical conductor cable from both end portions thereof. Furthermore, it will be possible to use more than two optical conductor cables and, for example, to supply the light rays to the divided optical conductor rod pieces, $10_1$ and $10_3$, $10_1$ to $10_3$ shown in FIG. 2C.

Figure 3:
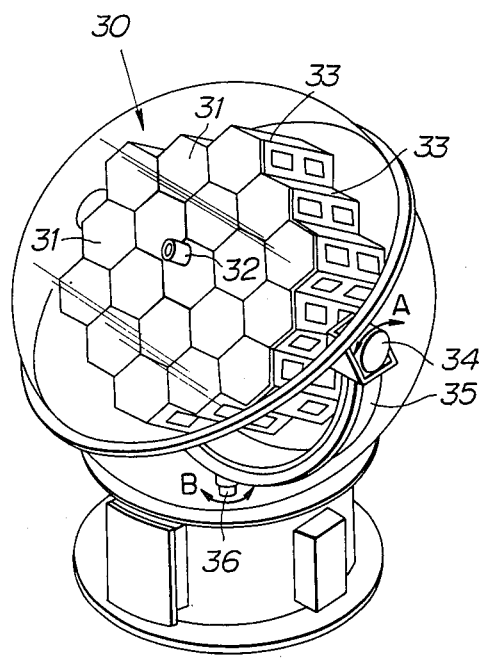
FIG. 3 is a structural view for explaining an embodiment of a solar ray collecting device which is employed for bringing the present invention into operation.

FIG. 3 is a detailed structural view for explaining a solar ray collecting device 30 which is accommodated in a transparent dome-shaped capsule. The solar ray collecting device 30 comprises a large number of lenses 31 (nineteen lenses in the embodiment shown in FIG. 3), a solar rays direction sensor 32 for detecting the direction of the solar rays, a support frame 33 for unitarily sustaining the lenses 31 and the solar rays direction sensor 32, a first motor 34 for rotatably moving in a direction shown by an arrow A the unitarily combined lenses 31, sensor 32 and support frame 33, a support art 35 for supporting the afore-mentioned lenses 31, sensor 32, support frame 33, and motor 34, a rotatable shaft 36 installed so as to meet at a right angle with the ratatable shaft of the afore-mentioned motor 34, and a second motor not shown in FIG. 3 for rotating the rotatable shaft 36 in a direction shown by an arrow B.

The direction of the solar rays is detected by the afore-mentioned solar rays direction sensor 32. The signal generated by the sensor 32 controls the first motor and the second motor so as to direct the lenses 31 toward the sun at all times. The solar rays focused by the lenses 31 are guided into the optical conductor cable 1 (see FIG. 1), the light receiving end portion of which is located at the focus position of the lenses 31. And further, the solar rays are transmitted through the optical conductor cable into the optical conductor rods(s) as shown in FIGS. 1 and 2.

As is apparent from the foregoing description, according to the present invention, the light rays transmitted through the optical conductor cable can be radiated in the desired radial direction ranging within the area of the radiation angle by use of a simple and low-cost construction. Consequently, the light rays transmitted through the optical conductor cable can be effectively utilized in order to illuminate only the desired area.

I claim:

1. A light radiator for receiving, guiding and radiating light rays comprising an elongated optical conductor rod means having a longitudinal axis, said optical conductor rod means having a longitudinal end which receives light rays which are guided by said conductor rod means, elongated dividing means dividing said rod means into a plurality of elongated parts, said dividing means passing through said longitudinal axis such that each of said elongated parts has an inner edge generally coincident with each longitudinal axis, said dividing means extending generally radially from said longitudinal axis such that each of said elongated parts has generally radially disposed side walls, said dividing means comprising reflecting surfaces which reflect light in a direction generally transversely of said longitudinal axis such that the light rays transmitted to said longitudinal end of said rod means are reflected by said reflecting surfaces and radiated from said rod means in a direction generally transverse to said longitudinal axis.

2. A solar radiator according to claim 1, wherein said rod means has a circular cross-sectional configuration and each of said elongated parts has a cross-sectional area configured as a section of a circle.

3. A solar radiator according to claim 2, wherein the center of said circularly configured rod means is coincident with said longitudinal axis.

4. A solar radiator according to claim 3, wherein each of said elongated parts has two side walls which are generally radially disposed and each of which extends radially outwardly from said longitudinal axis, each of said elongated parts having an outer cylindrical wall formed by a portion of a cylinder.

5. A solar radiator according to claim 3, wherein said reflecting surfaces reflect the light rays radially outwardly of said rod means.

6. A solar radiator according to claim 1, wherein said rod means has a second longitudinal end, said dividing means extending the longitudinal length of said rod means between both longitudinal ends thereof.

7. A solar radiator according to claim 1, wherein said dividing means comprises optical paste for adhering the elongated parts which are disposed adjacent to one another.

8. A solar radiator according to claim 2, wherein said rod means comprises a transparent outer casing in which said elongated parts are disposed.

9. A solar radiator according to claim 8, wherein said outer casing has a cylindrical configuration.

10. A solar radiator according to claim 1, wherein said rod means has a second longitudinal end which also receives light rays which are guided by the rod means.

11. A light radiator for receiving, guiding and radiating light rays comprising an elongated cylindrical optical conductor rod having a longitudinal axis, said rod having a longitudinal end which receives light rays, reflecting means dividing said rod into a plurality of elongated parts, said reflecting means passing through said longitudinal axis such that each of said elongated parts has an inner edge generally coincident with said longitudinal axis, said reflecting means extending generally radially from said longitudinal axis such that each of said elongated parts has generally radially disposed side walls, said reflecting means comprising reflecting surfaces which reflect light in a radial direction such that the light rays transmitted to said longitudinal end of said rod are reflected by said reflecting surfaces and radiated from said rod in a direction generally radial to said longitudinal axis.

12. A light radiator for radiating light rays comprising an elongated optical conductor rod means having a longitudinal axis, said rod means having a longitudinal end, solar ray collecting means for collecting solar rays and for transmitting said collected solar rays to said longitudinal end of said rod means, elongated dividing means dividing said rod means into a plurality of elongated parts, said dividing means passing through said longitudinal axis such that each of said elongated parts has an inner edge generally coincident with said longitudinal axis, said dividing means extending generally radially from said longitudinal axis such that each of said elongated parts has generally radially disposed side walls, said dividing means comprising reflecting surfaces which reflect light in a direction generally transversely of said longitudinal axis such that the light rays transmitted to said longitudinal end of said rod means by said solar ray collecting means are reflected by said reflecting surfaces and radiated from said rod means in a direction generally transverse to said longitudinal axis.

* * * * *